United States Patent [19]

Botter nee Bergheaud et al.

[11] 3,983,019

[45] Sept. 28, 1976

[54] SEPARATION OF THE MERCURY ISOTOPES BY THE INDIRECT PHOTOCHEMICAL METHOD

[75] Inventors: Fernande Botter nee Bergheaud, Gif-sur-Yvette; Monique Scaringella nee Desnoyer, Versailles; Michel Wacongne, Epinay-sur-Orge, all of France

[73] Assignee: Commissariat a l'Energie Atomique, Paris, France

[22] Filed: Oct. 1, 1973

[21] Appl. No.: 402,356

[30] Foreign Application Priority Data

Oct. 26, 1972 France .............................. 72.38033

[52] U.S. Cl. .................. 204/157.1 R; 204/DIG. 11
[51] Int. Cl.² ............................................ B01J 1/10
[58] Field of Search .............................. 204/157.1 R

[56] References Cited

UNITED STATES PATENTS

| 2,713,025 | 7/1955 | Billings........................ 204/157.1 R |
| 3,673,406 | 6/1972 | Nief et al. .................... 204/157.1 R |

*Primary Examiner*—Howard S. Williams
*Attorney, Agent, or Firm*—Cameron, Kerkam, Sutton, Stowell & Stowell

[57] ABSTRACT

A method of photochemical separation of the mercury isotopes by the so-called indirect route in which a gas stream of oxygen and butadiene containing a mixture of mercury isotopes is passed through one or a number of vessels placed in series. The gas stream is irradiated by a lamp containing mercury which is depleted in one or a number of the isotopes and said isotopes are recovered in a trap placed downstream of the vessel or vessels.

11 Claims, No Drawings

SEPARATION OF THE MERCURY ISOTOPES BY THE INDIRECT PHOTOCHEMICAL METHOD

This invention relates to the separation of the mercury isotopes by the indirect photochemical method and in particular to the separation of the isotope 196 which is initially employed in the preparation of the isotope 197 by irradiation, this isotope being in great demand in the medical field as a gamma emitter.

In order to carry out the isotopic separation of mercury, two methods are usually employed, namely the electromagnetic method of separation in which mercury having a concentration of the order of 50 % in $Hg^{196}$, for example, is obtainable at extremely high cost by means of a calutron, and the photochemical method of separation which is known as the direct method in order to distinguish it from the indirect method of separation according to the invention, and which makes it possible to obtain mercury containing 5 – 6 % $Hg^{196}$ in an undoubtedly economic manner but does not permit a considerable improvement in concentration.

Direct photochemical separation of isotopes is performed as follows:

Let $A_1 X, A_2 X, ... A_n X$ be a mixture of molecules in which $A_2, ..., A_n$ are the isotopes of an element A. The principle of separation consists in exciting by means of photons a single species of molecules ($A_1X$, for example), which then becomes more reactive than the nonexcited molecules.

Complete separation of the isotope $A_1$ can be carried out if there exists a compound Y which reacts only with the excited molecule $A_1 X.*$ The general diagram of a photochemical separation is given by the following equations:

  (1)

  (2)

$A_1 X$ absorbs a photon (1), then reacts in accordance with (2) whereas the other species do not react.

Only the isotope $A_1$ is finally present in the form of the compound $A_1 Z$.

Direct photochemical separation of mercury has been described in particular in the article by Jean Rozenbergt published in volume 3, number 3 of "Isotopes and Radiation Technology", pages 200 to 205 as well as in French Patent No. 1,596,540 and in U.S. Pat. No. 2,713,025.

In the case of mercury, a gaseous mixture of oxygen, butadiene and natural mercury is oxidized by means of the emission of the line 2537 A of a lamp containing mercury which is enriched in the desired isotope. This oxidized isotope is deposited on the walls of the reaction vessel and can consequently be separated.

Accordingly, by making use of a lamp containing mercury enriched to 20 % in $Hg^{196}$, it is possible to produce mercury enriched in $Hg^{196}$ at a concentration of 5 to 10 % which is suitable for production of the isotope 197 as desired by medical practitioners by reason of its applications, especially as an emitting source in the detection of tumors, in scintigraphy of the brain and of the spleen.

However, when it is found necessary to increase the efficiency of the separation process, difficulties are encountered owing to the fact that the oxidation of the excited mercury atoms is accompanied by non-selective parasitic oxidation of the mercury.

The final concentration of the isotope 196, for example, depends on the characteristics of the photochemical oxidation of mercury and in particular on the secondary parasitic reactions and on the quantum yield R.

It is in fact known that, in addition to the "primary" oxidation which applies to the excited atoms of mercury, there exists a non-selective "secondary" parasitic oxidation which is due to oxygen molecules brought to various states of excitation and which is limited by butadiene.

The total quantum yield R of photochemical oxidation is defined as being the ratio of the number of oxidized mercury atoms to the number of photons received by the reaction mixture. R varies with the composition of the mixture ($O_2 + C_4H_6$) and the pressure of the gas mixture ($O_2 + C_4H_6 + Hg$) but is always of very small value and less than $10^{-2}$; good conditions correspond to 30 % butadiene and to a low pressure of the order of 6 to 15 mm Hg. It proves not only impossible to eliminate parasitic reactions but necessary in addition to introduce a sufficient flow of natural mercury to ensure that the discharge rate of $Hg^{196}$ is such as to attain the photochemical oxidation yield R of this isotope. If this condition is not satisfied, the concentration of $Hg^{196}O$ is reduced even further.

There has now been discovered a method which makes it possible to overcome the disadvantages mentioned in the foregoing and also offers many advantages as will become apparent from the remainder of the present description.

The invention is concerned with a method of photochemical separation of the mercury isotopes by the so-called indirect route which consists in passing through one or a number of vessels mounted in series, a gas stream of oxygen and butadiene containing a mixture of mercury isotopes, in irradiating said gas stream by means of a lamp containing mercury depleted in one or a number of the isotopes and in recovering said isotopes in a trap placed downstream of the vessel or vessels.

Irradiation by means of a lamp containing mercury which is depleted in one or a number of the desired isotopes has the effect of reacting and retaining within the vessel or vessels the undesirable isotopes in oxidized form and in recovering the desired isotopes in a trap located downstream of the gas stream, contrarily to what occurs in the direct photochemical method described earlier.

For example, in the case of mercury which has already been enriched in the isotope 196 and subjected to the irradiation of a natural mercury lamp, there is essentially observed an oxidation of all the isotopes with the exception of mercury-196 which remains preferentially unaffected and which is found to be highly enriched downstream of the photochemical oxidation vessel.

In the indirect photochemical method as opposed to the direct method, a very small flow of mercury vapor is employed in order to obtain a high photochemical oxidation yield R by stopping all the undesired isotopes whereas the isotope 196 passes downstream, subject to possible parasitic reactions which retain this isotope partially within the vessel. It is therefore apparent that, if a low production rate is found acceptable, very high concentrations of the order of 80 % in isotopes 196 are attained as will be explained hereinafter.

However, the use of a low pressure under conditions of low gas flow rates of the reaction mixture is conducive to parasitic diffusion, that is to say to escape of the isotopes 198 to 204 towards the trap without oxidation. It is thus found that the percentage F of these isotopes which are oxidized by passing through an annular vessel is far from 100 % under conditions in which it is known that the reaction vessel has received a greater number of photons that would be necessary in order to oxidize the entire quantity of mercury which passes through. In fact, it has been possible to establish this "dynamic yield F" as a result of earlier experiments in which an excess quantity of mercury with respect to the photons received by the vessel was passed through under different operating conditions such as gas flow rate and vessel thickness. It has also been found that the entire quantity of light was absorbed in a thickness of 2 mm whilst a vessel having a thickness of 5 mm did not provide any gain. In addition to the parasitic photochemical decomposition of the mercury oxide produced and already taken into account in the dynamic yield F, a cause of difficulty in this case is the diffusion of certain gas molecules of mercury as already mentioned.

It must be assumed that the molecules of mercury diffuse at variable distances from the point of admission into the annular vessel in order to explain the results of the dynamic oxidation yields F which is in any case an increasing function of the concentration of the isotope considered in the emitting lamp.

Table I gives three examples of yield F obtained by means of the indirect photochemical method as applied to mercury which is pre-enriched in the isotope 196 with a annular vessel illuminated by a natural mercury lamp.

This table shows a decrease in the yield F as a function both of the increase in gas flow rate and in the partial pressure of the mercury; the yield also decreases but not proportionally as a function of the duration of the test.

In order to improve the efficiency of the separation process, recourse is had to the three following means a. a plurality of annular vessels in series, b. a spiral vessel in which the gas is subjected to real contact in front of the light source for a known period of time, c. recycling of the gas through one or a number of annular vessels.

The means aforesaid are set forth in detail hereinafter.

a. A plurality of vessels in series.

The test D was carried out with mercury pre-enriched in the isotope 196 and two annular vessels irradiated by natural mercury lamps; the vessels were placed in series and the path between the two vessels was heated in order to prevent any loss of mercury. The results are recorded in Table II which indicates the calculated values of the oxidation yields as percentages of each oxidized mercury isotope, namely $F_1$ in vessel 1 and $F_2$ in vessel 2.

By way of comparison, this table also recalls the oxidation yield F of test C with a single vessel in which the conditions of gas flow rate, of mercury vapor flow rate and of initial concentration of the mercury were comparable as well as the calculated isotopic concentrations of the mercury between the two vessels.

It is apparent that the yield $F_1$ of test D is very close to the yield F of test C and that the yield $F_2$ of test D is still closely related thereto whilst the greater differences in yield are shown by the isotopes 200, 202, and 204 as a result of the substantial reduction of their concentration in the mercury which enters the second vessel.

In consequence, when starting with mercury which has been pre-enriched by direct photochemical process to approximately 10 % in isotope 196 and when assimilating the oxidation yields of all the other isotopes to approximately 0.8 per vessel and to 0 in the case of the isotope 196, it is possible to expect roughly the following enrichment by increasing the number of vessels in series:

| 10 % | 1st vessel | 30 % | 2nd vessel | 70 % | 3rd vessel | 93 % |
|------|------------|------|------------|------|------------|------|

In fact, two experiments involving the use of two vessels have resulted in a final mercury having concentrations of 70 % and 80 % respectively.

b. Spiral vessel.

Indirect photochemical tests were carried out by starting with mercury pre-enriched in isotope 196 with a spiral vessel which had the same height and the same diameter as the annular vessels mentioned earlier but in which the gas was subjected to a smaller excess of natural mercury light on account of the solid portions of glass corresponding to the junction of the coils.

In Table III, the results of test E obtained with a single vessel are compared with those obtained during test C. It is apparent that the oxidation yields obtained, namely the yields F of test E, correspond substantially to the overall yield of two annular vessels which both have the oxidation yields F of $C_3$, this being an excellent yield in every respect in the case of all mercury isotopes other than 196.

By employing an initial mercury which is pre-enriched to 10 % in 196, mercury having a final concentration of 75 % is obtained by oxidizing 97 % of all the other isotopes and 20 % of isotope 196.

c. Recycling of the gas through a vessel.

As has been mentioned in the foregoing, not one but a plurality of isotopes can be permitted to pass downstream of a vessel. One interesting case is that which consists in allowing (n−1) isotopes to pass from a mixture of n isotopes and thus obtaining a downstream depletion in one isotope. This is illustrated in the following example of a depletion in $Hg^{202}$.

In this case, natural mercury which was fixed on a gold leaf was heated to 300° or 400°C in a stream of oxygen and butadiene. A magnetic-drive pump carrying glass vanes was used for displacing the mixture of mercury vapor, oxygen and butadiene in rotational flow through an annular vessel illuminated at the center of this latter by a lamp enriched in mercury-202 to 95 or 99 %.

Only on completion of the test, a trap located behind the vessel was cooled with solid carbon dioxide (dry ice).

With respect to the initial natural mercury containing 29.8 % of the isotope 202, there were obtained in the trap depletions corresponding to a concentration of the isotope 202 within a range of 3 % to 0.8 %. A comparison with test C of a single pass through an annular vessel shows that the concentration of mercury 202 drops from 16.94 to 7.13 % between the initial mercury and that of the trap.

By transposing this system to photochemical processing of mercury pre-enriched to 10 % in 196 and subjected to irradiation by a natural mercury lamp containing 99.85 % of isotopes other than 196, a mercury is obtained which has a concentration of isotope 196 within the range of 50 % to 77 %.

It is apparent from the foregoing that, apart from the advantages of an economic order which are obtained in comparison with the Calutron process mentioned in the foregoing, the method according to the invention for the separation of isotopes by the indirect photochemical method offers even further advantages over the direct photochemical method.

In particular, the invention makes it possible to start with very weakly enriched mercury and its yield in the desired isotope can be enhanced as has already been seen and can attain values in the vicinity of 80 %.

TABLE I

| TESTS | Tests A, B, C with an annular vessel Natural Hg lamp | | |
|---|---|---|---|
| | A | B | C |
| Quantity of Hg employed ($\mu$g) | 2750 | 1200 | 600 |
| Duration of test (hours) | 18 | 24 | 44.5 |
| Gas flow rate (cm$^3$/s) at 10 torrs | 9 | 5.3 | 1.9 |
| Mean flow rate of Hg ($\mu$g per hour) | 153 | 50 | 13 |
| Quantity of Hg found in trap ($\mu$g) | 1000 | 400 | 150 |

| Isotope concentration | Concentration initial Hg (%) | Concentration trap Hg (%) | Concentration initial Hg (%) | Concentration trap Hg (%) | Concentration initial Hg (%) | Concentration trap Hg (%) |
|---|---|---|---|---|---|---|
| Mass of Isotopes | | | | | | |
| 196 | 6.62 | 20.88 | 10.67 | 32.96 | 9.88 | 35.88 |
| 198 | 12.56 | 12.66 | 11.44 | 10.28 | 11.84 | 10.63 |
| 199 | 26.41 | 26.42 | 22.44 | 19.67 | 25.45 | 20.83 |
| 200 | 15.85 | 9.34 | 16.46 | 9.62 | 15.76 | 8.28 |
| 201 | 17.37 | 17.61 | 15.97 | 14.57 | 15.27 | 13.61 |
| 202 | 16.18 | 8.01 | 17.91 | 8.80 | 16.94 | 7.13 |
| 204 | 5.01 | 5.08 | 5.11 | 4.09 | 4.87 | 3.63 |

| Data on oxidation yield | F | 1-F | F | 1-F | F | 1-F |
|---|---|---|---|---|---|---|
| Mass of isotopes | | | | | | |
| 196 | 0 | 1 | 0 | 1 | 0.092 | 0.9078 |
| 198 | 0.63 | 0.37 | 0.70 | 0.30 | 0.78 | 0.22 |
| 199 | 0.67 | 0.33 | 0.70 | 0.30 | 0.80 | 0.20 |
| 200 | 0.79 | 0.21 | 0.78 | 0.22 | 0.87 | 0.13 |
| 201 | 0.63 | 0.37 | 0.69 | 0.31 | 0.78 | 0.22 |
| 202 | 0.82 | 0.18 | 0.84 | 0.16 | 0.90 | 0.10 |
| 204 | 0.63 | 0.37 | 0.73 | 0.27 | 0.81 | 0.19 |

TABLE II

| | Test D with two annular vessels Natural Hg lamp | | | |
|---|---|---|---|---|
| Flow rate of carrier gas | 2 cm$^3$/sec at 10 torrs | | | |
| Operating pressure | 10 torrs | | | |
| Total duration | 46 hours | | | |

| Distribution of flow rates of Hg | Mean total flow rate: 14.4 $\mu$g/hr | Flow rate of oxidized Hg in the 1st vessel: 10.7 $\mu$g/hr | Flow rate of oxidized Hg in the 2nd vessel: 1.55 $\mu$g/hr. | |
|---|---|---|---|---|
| Distribution of quantities | Total: 660 $\mu$g initial Hg | 1st vessel: 492 $\mu$g | 2nd vessel: 71 $\mu$g | Trap 96 $\mu$g |
| Isotopic concentration | Initial Hg (%) | 1st vessel (%) | 2nd vessel (%) | Trap (%) |
| Mass of isotopes | | | | |
| 196 | 10.97 | 1.13 | 8.55 | 70.37 |
| 198 | 11.94 | 12.67 | 14.37 | 4.28 |

TABLE II-continued

| | Test D with two annular vessels Natural Hg lamp | | | |
|---|---|---|---|---|
| 199 | 24.34 | 26.01 | 28.50 | 7.65 |
| 200 | 15.43 | 17.97 | 12.52 | 4.79 |
| 201 | 16.69 | 17.62 | 20.40 | 5.75 |
| 202 | 15.83 | 19.22 | 10.91 | 5.36 |
| 204 | 4.80 | 5.37 | 5.45 | 1.80 |

| Mass of isotopes | F in the Vessel of test C | $F_1$ in the 1st vessel | $F_2$ in the 2nd vessel | Intermediate concentration of Hg between two vessels of test D |
|---|---|---|---|---|
| 196 | 0.092 | 0.067 | 0 | 30.90 |
| 198 | 0.780 | 0.790 | 0.750 | 9.29 |
| 199 | 0.80 | 0.800 | 0.750 | 19.7 |
| 200 | 0.87 | 0.870 | 0.650 | 8.0 |
| 201 | 0.78 | 0.79 | 0.750 | 14.0 |
| 202 | 0.90 | 0.905 | 0.590 | 5.9 |
| 204 | 0.81 | 0.834 | 0.650 | 3.0 |

TABLE III

| Test E with a spiral vessel Natural Hg lamp | |
|---|---|
| Flow rate of carrier gas | 1 cm³/sec at 10 torrs |
| Operating pressure | 10 torrs |
| Total duration | 48 hours |

| Quantity distribution of Hg | Total: 930 µg initial Hg | Spiral vessel 18.3 µg | | Comparison |
|---|---|---|---|---|

| Mass of isotopes | Concentration of initial Hg (%) | Concentration of Hg of vessel (%) | Concentration of Hg of trap (%) | F (experimental) for one vessel | F calculated for two annular vessels identical with that of test C |
|---|---|---|---|---|---|
| 196 | 2.98 | 0.70 | 46.19 | 0.21 | 0.17 |
| 198 | 13.05 | 13.24 | 8 | 0.966 | 0.956 |
| 199 | 27.15 | 27.58 | 14.98 | 0.97 | 0.96 |
| 200 | 16.98 | 17.51 | 7.39 | 0.977 | 0.983 |
| 201 | 16.80 | 16.99 | 10.48 | 0.966 | 0.955 |
| 202 | 17.96 | 18.74 | 9.69 | 0.971 | 0.99 |
| 204 | 5.08 | 5.24 | 3.27 | 0.966 | 0.964 |

What we claim is:

1. A method of photochemical separation of the mercury isotopes comprising the steps of passing through at least one vessel mounted in series, a gas stream of oxygen and butadiene containing a mixture of mercury isotopes, irradiating said gas stream by a lamp containing mercury depleted in at least one of the desired isotopes and then recovering said desired isotopes in a trap placed downstream of the vessels.

2. A method of separation according to claim 1, wherein the irradiation is carried out by means of a natural mercury lamp.

3. A method of separation according to claim 1, wherein the irradiation is carried out by means of a lamp containing mercury which is depleted in all the isotopes except for the isotope in which the mixture is to be depleted.

4. A method of separation according to claim 3, wherein the isotope in which the mixture is to be depleted is $Hg^{202}$.

5. A method of separation according to claim 1, wherein the mixture of mercury isotopes is natural mercury.

6. A method of separation according to claim 1, wherein the mixture of mercury isotopes is enriched in the isotope to be isolated.

7. A method of separation according to claim 6, wherein the isotope to be isolated is $HG^{196}$.

8. A method of separation according to claim 1, the vessels being annular and surrounding a mercury lamp.

9. A method of separation according to claim 1, the vessel being a single annular vessel surrounding a mercury lamp and comprising a spiral fluid-circuit.

10. A method of separation according to claim 1, the vessel being a single annular vessel surrounding a mercury lamp and the mixture of isotopes being circulated several times within said vessel before effecting the withdrawal of the desired isotope or isotopes.

11. A method of separation according to claim 1, wherein the gas stream has a flow rate of approximately 1 to 10 cm³/sec at a pressure of 10 torrs.

* * * * *